United States Patent
Calvin et al.

(10) Patent No.: US 9,139,141 B2
(45) Date of Patent: Sep. 22, 2015

(54) PIVOTABLE BEARING SKATE AND PIVOTABLE BEARING SKATE EXTENDABLE CARGO BED FRAME ASSEMBLY

(71) Applicant: M & M EXTENDO, LLC, Boise, ID (US)

(72) Inventors: Nate H. Calvin, Boise, ID (US); Thomas Var Reeve, Eagle, ID (US); Patrick C. Beyers, Eagle, ID (US)

(73) Assignee: M&M EXTENDO, LLC, Boise, ID (US)

( * ) Notice: Subject to any disclaimer, the term of this patent is extended or adjusted under 35 U.S.C. 154(b) by 0 days.

(21) Appl. No.: 14/217,242

(22) Filed: Mar. 17, 2014

(65) Prior Publication Data

US 2014/0300128 A1     Oct. 9, 2014

Related U.S. Application Data

(60) Provisional application No. 61/802,627, filed on Mar. 16, 2013.

(51) Int. Cl.
| | |
|---|---|
| B60P 3/34 | (2006.01) |
| B60R 11/06 | (2006.01) |
| F16C 29/00 | (2006.01) |
| F16C 29/04 | (2006.01) |

(52) U.S. Cl.
CPC ............... *B60R 11/06* (2013.01); *F16C 29/007* (2013.01); *F16C 29/045* (2013.01)

(58) Field of Classification Search
CPC ............... A63C 17/06; A63C 17/1436; A63C 2203/42; A63C 17/1409; A63C 17/226; A63C 17/22; A63C 17/1427

USPC ........ 296/26.09; 280/11.216, 11.221, 11.223, 280/11.231, 11.27; 301/5.7

See application file for complete search history.

(56) References Cited

U.S. PATENT DOCUMENTS

| | | | | |
|---|---|---|---|---|
| 4,297,071 | A  * | 10/1981 | Dunbar | 414/542 |
| 4,418,817 | A  * | 12/1983 | Martin et al. | 198/845 |
| 5,301,798 | A  * | 4/1994 | Wilkens | 198/750.3 |
| 5,325,957 | A  * | 7/1994 | Wilkens | 198/750.2 |
| 5,415,505 | A  * | 5/1995 | Halpin et al. | 410/9 |
| 5,513,941 | A  * | 5/1996 | Kulas et al. | 414/522 |
| 5,575,489 | A  * | 11/1996 | Oyen et al. | 280/11.225 |
| 5,988,722 | A  * | 11/1999 | Parri | 296/26.09 |
| 6,065,792 | A  * | 5/2000 | Sciullo et al. | 296/26.09 |
| 6,176,045 | B1 * | 1/2001 | McManus et al. | 52/67 |
| 6,601,899 | B2 * | 8/2003 | Kiester et al. | 296/39.2 |
| 6,666,643 | B1 * | 12/2003 | Heynssens | 414/542 |
| 6,840,558 | B1 * | 1/2005 | Darbishire et al. | 296/26.09 |
| 6,863,328 | B2 * | 3/2005 | Kiester et al. | 296/37.6 |
| 6,866,316 | B1 * | 3/2005 | Harder et al. | 296/26.09 |

(Continued)

*Primary Examiner* — Kiran B Patel
(74) *Attorney, Agent, or Firm* — Charles R. Clark

(57) ABSTRACT

A bearing skate system for an extendable cargo bed frame assembly is provided to improve the performance of the cargo bed frame assembly. The bearing skate system has a plurality of pivotable bearing skates and each bearing skate has a pivotable skate plate having a plurality of rotating main bearings distributed along the skate plate between each side of a pivot axis of said skate plate to allow a plurality of said rotating main bearings of each skate plate to participate in supporting the cargo bed frame assembly and a cargo load on the cargo bed frame assembly when the assembly is in a closed position, in an open position, and in all intermediate positions between the closed position and the open position during extension or retraction of the cargo bed frame assembly.

3 Claims, 7 Drawing Sheets

(56) References Cited

U.S. PATENT DOCUMENTS

| | | | |
|---|---|---|---|
| 6,921,120 B1 * | 7/2005 | Ervin | 296/26.02 |
| 6,981,728 B2 * | 1/2006 | Rasmussen | 296/26.01 |
| 7,090,275 B2 * | 8/2006 | Pero | 296/37.6 |
| 7,111,887 B2 * | 9/2006 | Cooley | 296/37.6 |
| 7,121,603 B2 * | 10/2006 | Stevenson et al. | 296/26.09 |
| 7,125,082 B2 * | 10/2006 | Copus | 298/1 A |
| 7,178,823 B1 * | 2/2007 | Tai | 280/656 |
| 7,232,172 B2 * | 6/2007 | Kiester et al. | 296/39.2 |
| 7,237,817 B2 * | 7/2007 | Kobylski et al. | 296/26.09 |
| 7,293,723 B2 * | 11/2007 | Niemela et al. | 239/672 |
| 7,445,263 B1 * | 11/2008 | Bluhm | 296/26.09 |
| 7,527,313 B2 * | 5/2009 | Peter | 296/26.12 |
| 7,651,148 B2 * | 1/2010 | Hustyi et al. | 296/76 |
| 7,726,719 B1 * | 6/2010 | Barron | 296/37.6 |
| 8,745,800 B1 * | 6/2014 | Morris | 14/71.3 |
| 8,967,694 B2 * | 3/2015 | Garceau | 296/26.13 |
| 2002/0005648 A1 * | 1/2002 | Carpenter et al. | 296/26.09 |
| 2002/0037203 A1 * | 3/2002 | Kiester et al. | 410/129 |
| 2007/0210599 A1 * | 9/2007 | Arnold | 296/26.09 |
| 2009/0026785 A1 * | 1/2009 | Nolan | 296/26.09 |
| 2009/0072566 A1 * | 3/2009 | Scribner et al. | 296/26.09 |
| 2009/0096237 A1 * | 4/2009 | Gagliano | 296/26.1 |
| 2010/0308613 A1 * | 12/2010 | Edwards | 296/26.09 |
| 2011/0170992 A1 * | 7/2011 | Rosenthal | 414/258 |

* cited by examiner

PIVOTABLE BEARING SKATE AND PIVOTABLE BEARING SKATE EXTENDABLE CARGO BED FRAME ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

FIELD OF THE INVENTION

Prior art for an extendable cargo bed frame assembly for mounting in and use in on a motor vehicle includes Cherry, U.S. Pat. No. 4,705,315 that incorporates eight rollers (single rotating main bearings) to slidingly support a cargo frame as the cargo frame extends outwardly and retracts inwardly from a motor vehicle equipped with the frame assembly in a cooperating relationship to an underlying transfer frame and as the transfer frame extends outwardly and retracts inwardly in a cooperating relationship to an underlying anchor frame.

Referring to FIGS. 1 to 4, the invention improves on prior art relating to a cantilevered extendable cargo bed frame assembly 2, having an anchor frame 4, slidingly attached below an intermediate transfer frame 12, and the intermediate transfer frame slidingly attached below a cargo frame 22; the prior art anchor frame is a generally rectangular anchor frame having one or more anchor frame cross members, a pair of end anchor frame coaxial stub axles 6 attached transversely at one end of said anchor frame to outer surfaces of the anchor frame and spaced parallel from a pair of intermediate anchor frame coaxial stub axles 8 attached to intermediate outer surfaces of the anchor frame and four fixed position anchor frame single rotating main bearings 10 each said anchor frame single rotating main bearing rotatably and individually mounted to one of said respective stub axles 6, 8; the prior art intermediate transfer frame has two spaced and parallel transfer frame slide rails 14 connected one to the other by a plurality of transfer frame cross members 16; each slide rail having two longitudinal and parallel bearing channels (an inner bearing channel 18 and an outer bearing channel 20) each said inner bearing channel sized to rotatably and slidingly receive said four fixed position anchor frame single rotating main bearings and each said outer bearing channel sized to rotatably and slidingly receive said four fixed position cargo frame single rotating main bearings; and the prior art cargo frame 22 comprises two spaced and parallel cargo frame side rails 24 connected one to the other by a plurality of cargo frame cross members 26, a pair of end cargo frame coaxial stub axles 28 attached transversely at one end of said cargo frame to interior end surfaces of the cargo frame and spaced parallel from a pair of intermediate cargo frame coaxial stub axles 30 attached to interior intermediate surfaces of the cargo frame, and said four fixed position cargo frame single rotating main bearings 32, each said cargo frame single rotating main bearing rotatably and individually mounted to a respective stub axle 28, 30; said fixed position anchor frame rotating main bearings slidingly received within the inner bearing channels of said transfer frame; and said fixed position cargo frame rotating main bearings slidingly received within the outer bearing channels of said transfer frame; and having a plurality of mechanical channel end stops to retain within said channels the respective inserted main bearings.

The several embodiments of the pivotable bearing skate of the present invention each include a pivotable bearing skate plate having a plurality of rotating main bearings distributed between both sides of the bearing skate's pivot point that make load bearing contact with either an upper or a lower interior load bearing surface of the bearing channels of an intermediate transfer frame of an extendable cargo bed frame assembly as the bearing skate pivots as the cargo bed assembly extends towards an open position or retracts towards a closed position.

The present invention, a pivotable bearing skate allows a greater cargo load to be handled by extendable cargo bed assembly that incorporates a plurality of the bearing skates with less risk of a main bearing failure particularly during movement of a motor vehicle because each bearing skate pivots and distributes the bearing load (both static loads and acute impact loads) to a plurality of rotating main bearings distributed and mounted on the bearing skate between both sides of the skate's pivot point.

BRIEF SUMMARY OF THE INVENTION

The present invention, a novel extendable cargo bed frame assembly uses a plurality of novel pivotable bearing skates with each pivotable bearing skate having a plurality of rotating main bearings mounted in line on a pivotable skate plate with one or more rotating main bearings on either side of the pivot axis of the skate plate that can advantageously be used in manufacturing an extendable cargo bed frame assembly or to retrofit a preexisting cargo bed frame assembly by replacing one or more or all pairs of coaxial fixed position single rotating main bearings in the cargo bed frame assembly to lessen the likelihood of a bearing failure under the bearing point loads of a load of a heavy cargo load.

A prior art cargo bed assembly such as shown in the Cherry patent ('315) uses a plurality of coaxial fixed position single rotating main bearings (rollers) that do not allow the bearing system of the cargo bed assembly to conform to geometric changes of the frame assembly during extension and retraction and only maximizes the bearing load points (BLPs) in a single position of the assembly and does not adequately accommodate the geometric changes of the inter-relationship (position and angle) between the multiple dynamic elements of the frame assembly during extension and retraction; the bearing load points of the Cherry ('315) bearing system are only maximized (by way of multiple contact points) when the frame assembly or apparatus is in one position (opened or closed or some point in-between).

The present invention has utility and provides novel advantages. The present invention uses a plurality of pivotable bearing skates as elements of a novel pivotable bearing skate extendable cargo bed frame assembly that uses a plurality of novel pivotable bearing skates to provide: constant adjustments of the skate bearing system to intra-system geometric changes of the frame assembly during extension and retraction (to the infinite number of geometric positions and unique variants of positions of inter-related elements of the frame assembly and their inherent geometry) such that the effectiveness of the bearing skate system is maximized by providing more bearing load points and better load distribution to the bearings of the bearing skates at all system positions of the frame assembly from a fully closed position to a fully open position of the frame assembly.

DETAILED DESCRIPTION OF THE INVENTION

Figure 1:
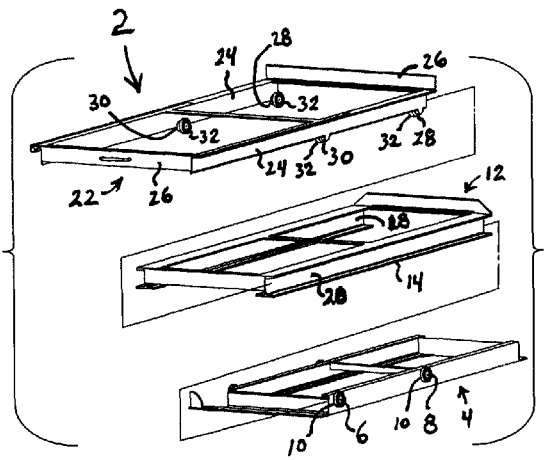
FIG. 1 is a partially exploded perspective view of a prior art extendable cargo bed frame assembly 2.
Figure 2:
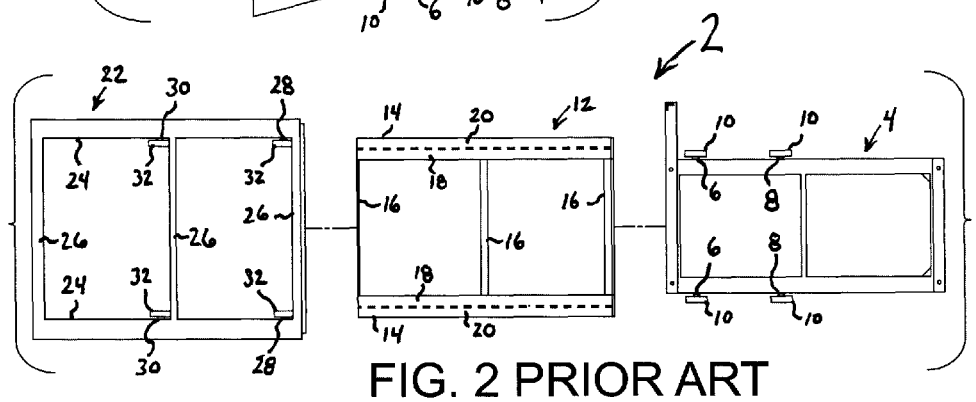
FIG. 2 is a partially exploded top view of the prior art frame assembly 2 shown in FIG. 1.
Figure 3:
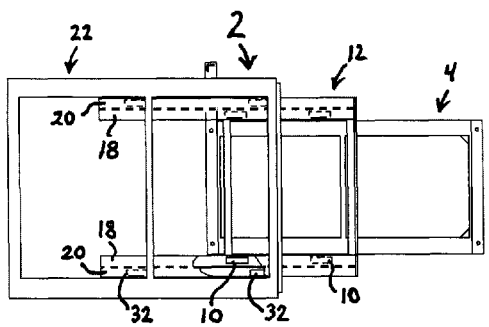
FIG. 3 is a top view of the prior art frame assembly 2 shown in FIG. 1 in a transition position between a closed position and an open position.
Figure 4:
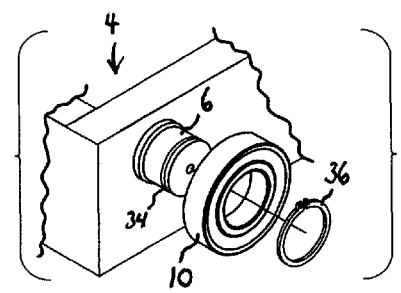
FIG. 4 is a partially exploded perspective view of a front left corner of a prior art anchor frame 4 showing a prior art single rotating main bearing 10 to be rotatably mounted to a stub axle 6 and retained thereon in an annular C-clip groove 34 by a C-clip 36.

A principal objective of the present invention is to provide an improved bearing system to improve the load carrying performance of a cantilevered extendable cargo bed frame assembly by providing a plurality of pivotable bearing skates each having a plurality of rotating main bearings that participate in distributing the forces resulting from supporting a cargo load that will permit heavier loads to be supported by the bed frame assembly with less likelihood for a bearing failure under static load forces and under acute impact load forces often encountered while a motor vehicle equipped with the cargo bed assembly travels over rough terrain or rough or bumpy or unimproved road surfaces.

Referring to FIGS. 5 to 32, a pivotable bearing skate extendable cargo bed frame assembly 140, 240, 340, 440, 540, 640, 740, or 840 can be advantageously assembled and comprises an anchor frame 104, 204, 304, 404, 504, 604, 704, or 804 having two pairs of coaxial stub axles 42, 44 that pivotably receive and retain respectively two pairs of pivotable bearing skates 50, 250, 350, 450, 550, 650, 750, or 850, an intermediate transfer frame 12 having two pairs of parallel spaced bearing skate (bearing) channels 18, 20, and a cargo frame 122 having two pairs of coaxial stub axles 46, 48 that pivotably receive and retain respectively two pairs of said pivotable bearing skates.

Referring to FIGS. 5 to 16, a best and first embodiment of an extendable cargo bed frame assembly 140 comprises an anchor frame 104 having two pairs of pivotable bearing skates 50 attached, an intermediate transfer frame 12, and a cargo bed frame 122 having two pairs of pivotable bearing skates 50 attached.

A novel extendable cargo bed frame assembly 140, 240, 340, 440, 540, 640, 740, or 840 can be advantageously assembled that incorporates an improved bearing system that uses preferably by pairs a plurality of multi-bearing pivotable bearing skates 50, 250, 350, 450, 550, 650, 750, or 850.

Figure 5:
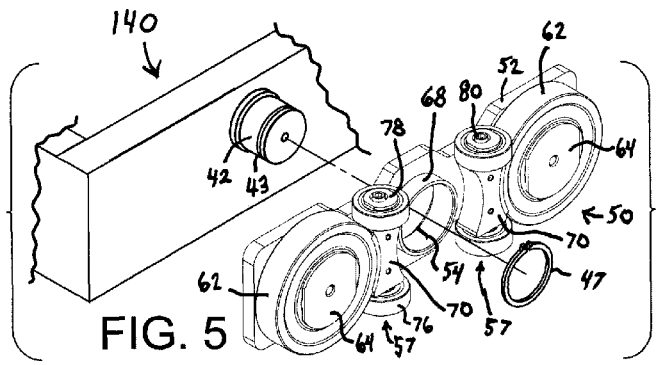
FIG. 5 is a partially exploded perspective view of a best and preferred first embodiment pivotable bearing skate 50 of a novel extendable cargo bed assembly 140, said first embodiment pivotable bearing skate to be rotatably mounted to a stub axle 42 having an annular C-clip groove 43 towards the distal end of said stub axle and retained on said stub axle by a C-clip 47 received and retained in said annular groove.
Figure 6:
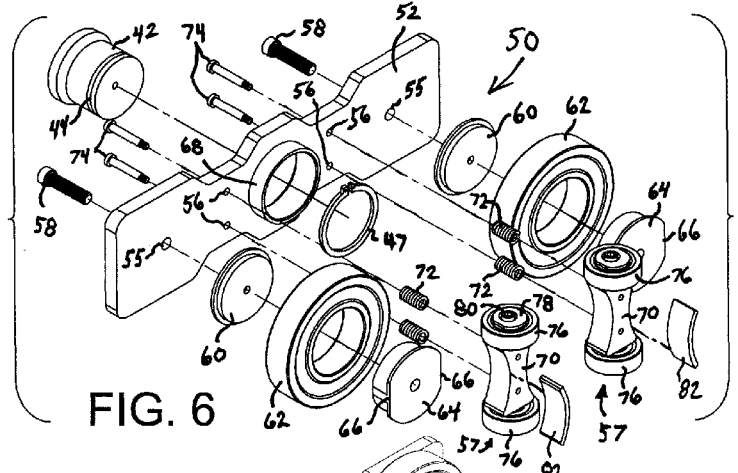
FIG. 6 is a partially exploded perspective view of the first embodiment pivotable bearing skate 50 shown in FIG. 5.
Figure 7:
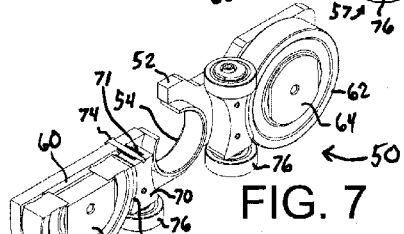
FIG. 7 is a partially cutaway perspective view of the first embodiment pivotable bearing skate 50 shown in FIG. 5 showing three rotating lateral bearings 76.
Figure 8:
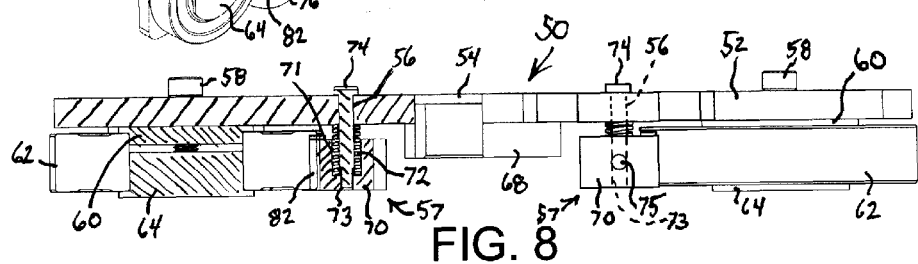
FIG. 8 is a partially cutaway top view of the first embodiment pivotable bearing skate 50 shown in FIG. 5 (no rotating lateral bearings are shown)
Figure 9:
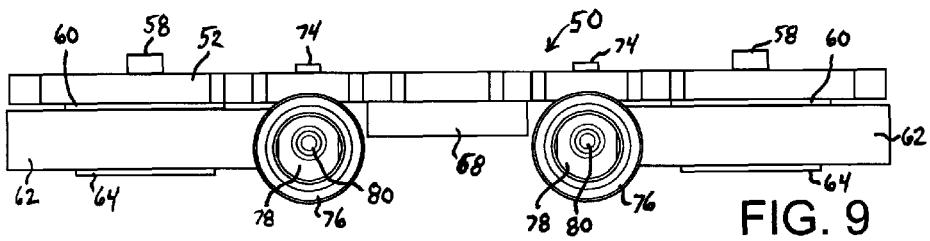
FIG. 9 is a top view of the first embodiment pivotable bearing skate 50 shown in FIG. 5.
Figure 10:
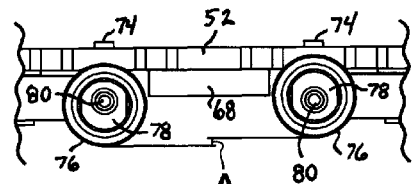
FIG. 10 is a partial top view of the first embodiment pivotable bearing skate 50 shown in FIG. 9 and showing a left rotating lateral bearing 76 in a maximum lateral position away from the skate plate and a right rotating lateral bearing 76 in a minimum lateral position away from the skate plate and showing with an indicia A that indicates a range of lateral positional adjustment available to the lateral bearings by selective rotation of a respective bearing cam hub 78 that is then fixed in position by a respective hub position fixing bolt 80.
Figure 11:
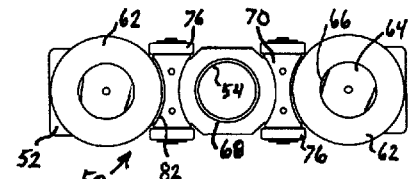
FIG. 11 is a front view of the first embodiment pivotable bearing skate 50 shown in FIG. 5.
Figure 12:
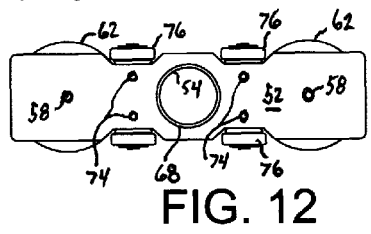
FIG. 12 is a rear view of the first embodiment pivotable bearing skate 50 shown in FIG. 5.
Figure 13:
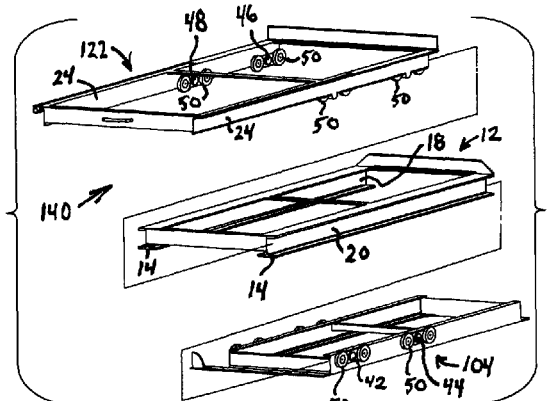
FIG. 13 is a partially exploded perspective view of a novel extendable cargo bed frame assembly 140 having a plurality of pivotable bearing skates 50 with each said pivotable bearing skate having a plurality of rotating main bearings.
Figure 14:
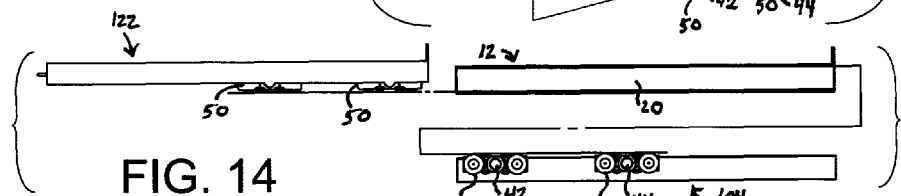
FIG. 14 is a partially exploded side view of the extendable cargo bed frame assembly 140 shown in FIG. 13.
Figure 15:
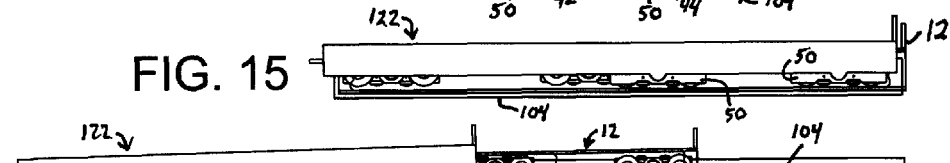
FIG. 15 is a side view of the extendable cargo bed frame assembly 140 shown in FIG. 13 in a closed (retracted) position.
Figure 16:
FIG. 16 is a partially cutaway side view of the extendable cargo bed frame assembly 140 shown in FIG. 13 in an open (extended) position with a portion of an intermediate frame 12 cutaway to allow a view of the load bearing contact points of the two pivotable bearing skates 50 mounted on an anchor frame 104 and showing the left such bearing skate in contact with an upper load bearing surface of the intermediate frame and the right such bearing skate in contact with a lower load bearing surface of the intermediate frame.

FIG. 5 is a partially exploded, perspective view of a preferred embodiment of a novel cargo bed frame assembly 140 showing a plurality of multi-bearing pivotable bearing skates 50 replacing a plurality of separately fixed position single rotating main bearings and showing the interrelationships between the anchor frame, the transfer frame, and the cargo frame (the bearing channels of the transfer frame 18, 20 are taller than the minimum vertical dimension of the plurality of rotating main bearings of each bearing skate received therein and thus during extension and retraction movement from a closed position to an open position and from the open position to the closed position) of the cargo bed frame assembly, each bearing skate can pivot to place said plurality of bearings of each said bearing skate into contact with a respective upper inner load bearing surface of a bearing skate channel or a respective lower inner load bearing surface of a bearing skate channel and the bearing point loads are thus lessened because the load is distributed throughout the system to said pluralities of rotating main bearings of each said pivotable bearing skate.

Referring to FIGS. 5 to 12, a best and first embodiment pivotable bearing skate 50 comprises a generally planar and rectangular pivotable skate plate 52 having a generally central transverse pivot bore 54 sized to pivotally receive and retain a stub axle of preferably an extendable bed frame assembly and said skate plate having two transverse bearing hub mounting bores 55 bracketing and preferably equidistant from said pivot bore, two spaced bearing hub mounting bolts 58, each said mounting bolt respectively inserted through and in one of said hub mounting bores, through and in one of two bearing hubs 60, through and in one of two coaxial rotating main bearings 62, and reversibly attached to one of two bearing retainer caps 64 that are preferably threaded to reversibly receive and retain said hub mounting bolts; each said retainer cap preferably having a plurality of wrench flats 66 formed along portions of said retainer cap outer circumferences (alternatively one of two nuts could engage and retain respective said bolts, hubs, bearings, and caps); said main bearings rotationally secured and having a generally common rotational plane parallel to the pivotal plane of said pivot bore; preferably said skate plate having four transverse spring and post member mounting bores 56 bracketing and preferably equidistant from said pivot bore and preferably between said pivot bore and said hub mounting bores, further preferably said skate plate having a stub axle sleeve 68 attached coaxial to said pivot bore; and preferably a portion of each main bearing circumference extends beyond the upper and lower perimeter of said skate plate; further said skate plate preferably having two post member assemblies 57, each said post member assembly respectively attached by two coil spring retention bolts 74, each said spring retention bolt inserted through and slidably retained in one of two said post member mounting bores closer to one of said hub mounting bores, coaxially through one of two coil compression springs 72, coaxially through one of two partial depth bores 71 of said assembly and preferably reversibly retained in one of two coil spring retention bores 73 of said assembly; each said post member assembly comprising a lateral bearing post member 70 preferably defined as having two opposite ends, two opposite concave and arc-shaped longitudinal sides, and two opposite spaced and parallel generally planar longitudinal sides; said post member having two spaced and parallel said partial depth bores 71 and each said depth bore perpendicular to one of said planar longitudinal sides, said partial depth bores spaced to cooperatively and coaxially align with two of said spring and post member retention bolt receiving bores 56 and each said depth bore sized to receive and hold one of two said coil compression springs 72 that preferably extends outwards beyond the outer surface of said post member; said post member having one of two coaxial smaller diameter said coil spring retention bolt bores 73 at the bottom of each said partial depth bore, each said retention bolt bore sized to receive and retain one of said coil spring retention bolts 74 coaxially inserted through and slidably retained in said spring and post member retention bolt receiving bores, through said compression springs, through said partial depth bores, and reversibly retained in said coil spring retention bores; said post member having in each said post member opposite end one of two coaxial hub position fixing bolt bores 75; two coaxial rotating lateral bearings 76 rotatably mounted respectively on two cam bearing hubs 78 and fixed in a selected lateral position respectively by two hub position fixing bolts 80 reversibly attached in said position fixing bolt bores; and preferably one or more replaceable felt-like bearing wiper pads 82 selectively attached with a suitable industrial adhesive to one or more of said arc-shaped longitudinal sides facing and in wiping contact with an adjacent rotating main bearing to wipe the outer bearing surface as the bearing rotates.

Figure 17:
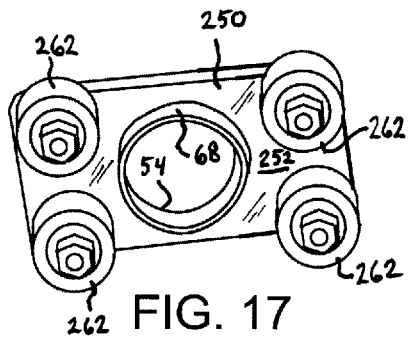
FIG. 17 is a perspective view of a second embodiment pivotable bearing skate 250.
Figure 18:
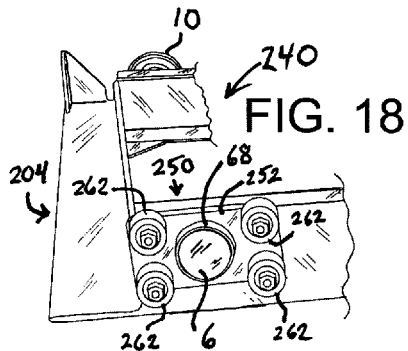
FIG. 18 is a perspective view of the second embodiment pivotable bearing skate 250 shown in FIG. 17 mounted on a partially shown anchor frame 204 of a partially shown retrofitted cargo bed frame assembly 240 and showing a fixed position single rotating main bearing 10 mounted opposite the second embodiment pivotable bearing skate on the far side of the anchor frame that has not yet been replaced by a second embodiment pivotable bearing skate.

Referring to FIGS. 17 and 18, a second embodiment pivotable bearing skate 250 comprises a generally planar and rectangular pivotable skate plate 252 having a generally central transverse pivot bore 54 sized to pivotally receive and retain a stub axle of preferably an extendable bed frame assembly 140, 240, 340, 440, 540, 640, 740, or 840 and said skate plate having four rotating main bearings 262 in close parallel rotational planes distributed and attached on one side of the skate plate preferably with each said main bearing equidistant to said pivot bore and said skate plate preferably having a stub axle sleeve 68 attached coaxial to said pivot bore; and preferably a portion of each main bearing circumference extends beyond the upper and lower perimeter of said skate plate.

Figure 19:
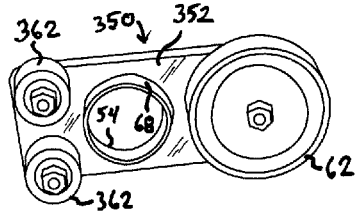
FIG. 19 is a perspective view of a third embodiment pivotable bearing skate 350.
Figure 20:
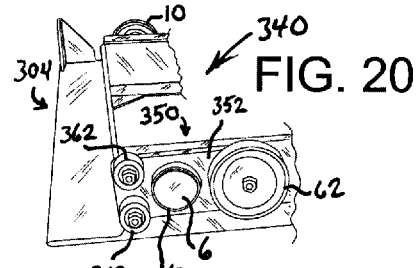
FIG. 20 is a perspective view of the third embodiment pivotable bearing skate 350 shown in FIG. 19 mounted on a partially shown anchor frame 304 of a partially shown retrofitted cargo bed frame assembly 340 and showing a fixed position single rotating main bearing 10 mounted opposite the third embodiment pivotable bearing skate on the far side of the anchor frame that has not yet been replaced by a third embodiment pivotable bearing skate.

Referring to FIGS. 19 and 20, third embodiment pivotable bearing skate 350 comprises a generally planar and rectangular pivotable skate plate 352 having a generally central transverse pivot bore 54 between two smaller radius rotating main bearings 362 and one larger radius rotating main bearing 62 in close parallel rotational planes distributed and rotatably attached in a triangular array about said pivot bore on one side of the skate plate preferably with each said main bearing equidistant to said pivot bore and said skate plate preferably having a stub axle sleeve 68 attached coaxial to said pivot bore to selectively and rotatably receive a stub axle of a cargo frame assembly 140, 240, 340, 440, 540, 640, 740, or 840.

Referring to FIGS. 19 and 20, a third embodiment bearing skate 350 comprises a generally planar and rectangular pivotable skate plate 352 having an upper plate edge preferably generally parallel and spaced from a lower plate edge, a transverse and generally central pivot bore 54 sized to pivotally receive and retain a stub axle of preferably an extendable bed frame assembly, two rotating smaller radius main bearings 362 at one end of said plate and a rotating larger radius main bearing 62 at the other end with said main bearings rotatably attached to said plate in closely parallel rotational planes and distributed and arranged in a triangular array on one side of said plate about said pivot bore; preferably a stub axle sleeve 68 attached to said skate plate coaxial to said pivot bore; and preferably a respective portion of each said smaller radius main bearing circumference and portions of said larger radius bearing circumference extend beyond the upper and lower perimeter of said skate plate.

Figure 21:
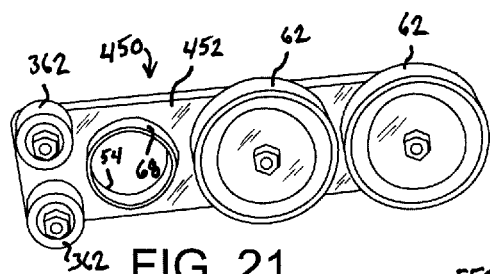
FIG. 21 is a perspective view of a fourth embodiment pivotable bearing skate 450.
Figure 22:
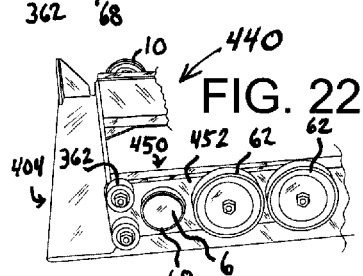
FIG. 22 is a perspective view of the fourth embodiment pivotable bearing skate 450 shown in FIG. 21 mounted on a partially shown anchor frame 404 of a partially shown retrofitted cargo bed frame assembly 440 and showing a fixed position single rotating main bearing 10 mounted opposite the fourth embodiment pivotable bearing skate on the far side of the anchor frame that has not yet been replaced by a fourth embodiment pivotable bearing skate.

Referring to FIGS. 21 and 22, a fourth embodiment pivotable bearing skate 450 comprises a skate plate 452 having a stub axle sleeve 68 and a pivot bore 54 sized to receive a stub axle of a cargo frame assembly between two smaller radius rotating main bearings 362 at one end of said third skate plate and two larger radius rotating main bearings 62 at the other end (the upper contact points of the two larger radius rotating main bearing are tangent to a first line that is tangent to the upper contact surface of the upper smaller radius rotating main bearing and the lower contact points of the two larger radius rotating main bearings are tangent to a second line that is tangent to the lower contact point of the lower smaller bearing).

Figure 23:
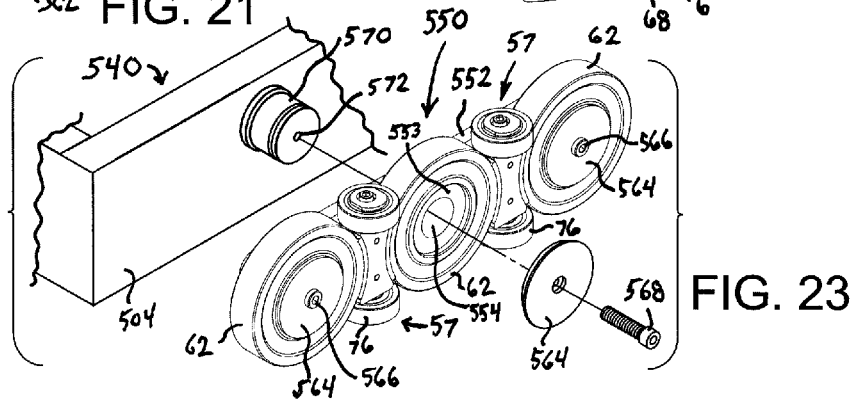
FIG. 23 is a perspective view of a fifth embodiment pivotable bearing skate 550 to be mounted on a partially shown anchor frame 504 of a partially shown cargo bed frame assembly 540.
Figure 24:
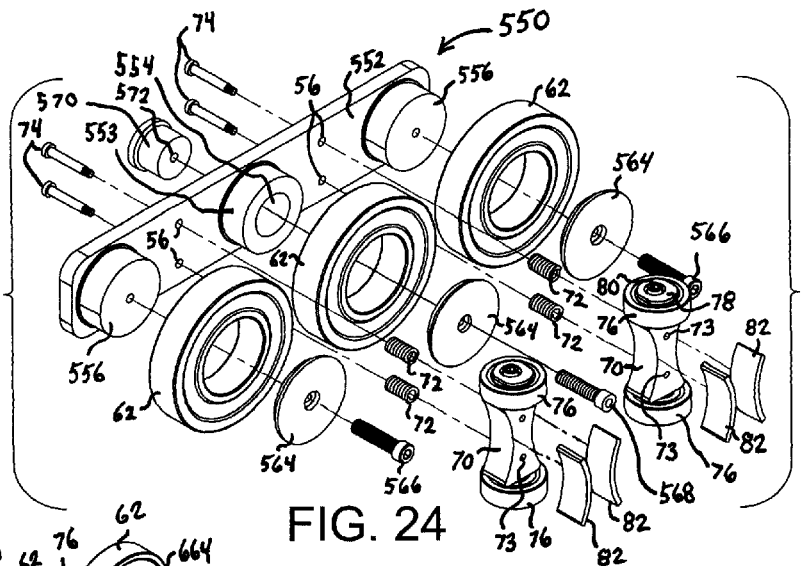
FIG. 24 is a partially exploded perspective view of the fifth embodiment pivotable bearing skate 550 shown in FIG. 23.
Figure 25:
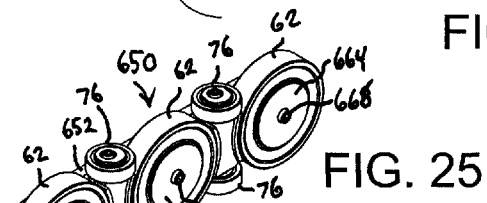
FIG. 25 is a perspective view of a sixth embodiment pivotable bearing skate 650.
Figure 26:
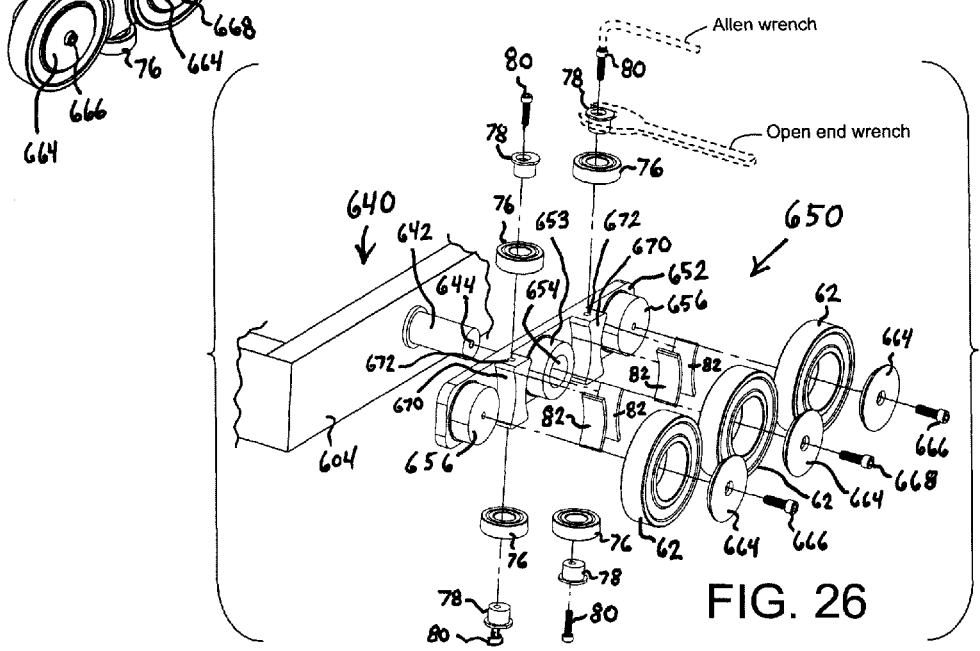
FIG. 26 is a partially exploded perspective view of the sixth embodiment pivotable bearing skate 650 shown in FIG. 25 to be mounted on a partially shown anchor frame 604 of a partially shown cargo bed frame assembly 640.
Figure 27:
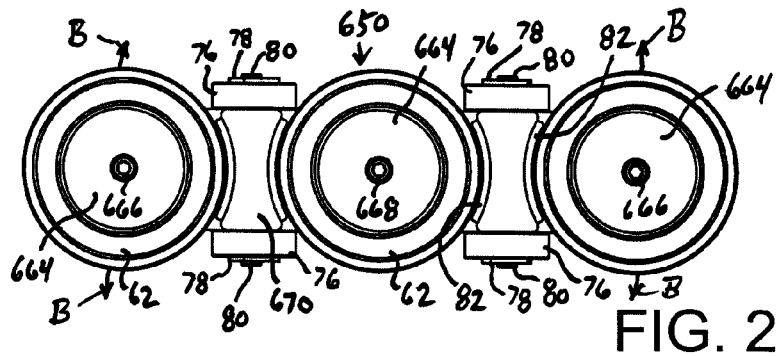
FIG. 27 is a front view of the sixth embodiment pivotable bearing skate 650 and showing four indicia arrows B showing the pivotability of the bearing skate.
Figure 28:
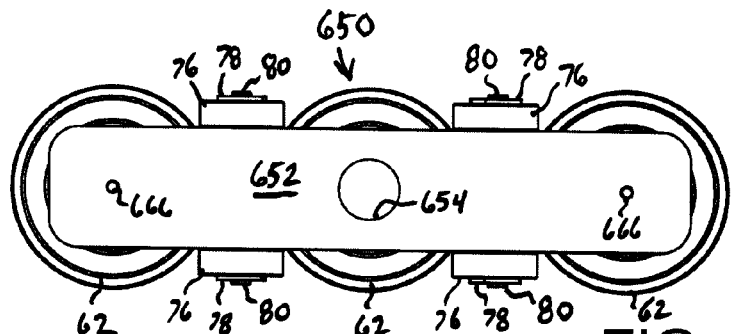
FIG. 28 is a back view of the sixth embodiment pivotable bearing skate 650.
Figure 29:
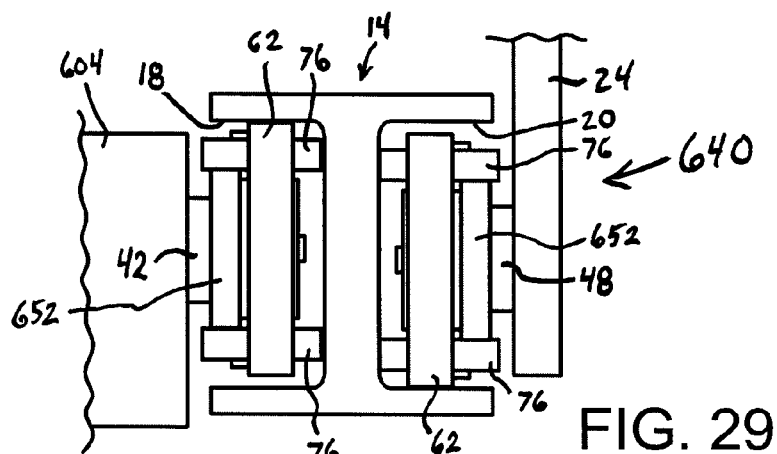
FIG. 29 is a partial end view of a sixth embodiment cargo bed frame assembly 640 illustrating the interrelationships between a left main bearing 62 of the left bearing skate 650 in load bearing contact with an upper load bearing surface of an inner bearing channel 18 and a right main bearing 62 of the right bearing skate 650 in load bearing contact with a lower load bearing surface of an outer bearing channel 20; bearing skate 650.
Figure 30:
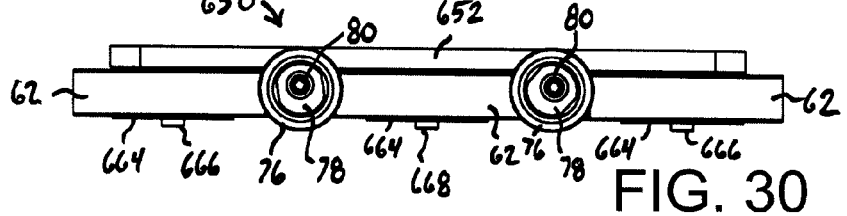
FIG. 30 is a top view of the sixth embodiment pivotable bearing skate 650.

Referring to FIGS. 23 and 24, a fifth embodiment pivotable bearing skate 550 comprises a generally planar and intermedially (intermediately) pivotable skate plate 552 having a central bearing spindle 553 having a preferably coaxial pivot bore 554 sized to pivotally receive and retain a stub axle 570 having a coaxial skate retaining bolt receiving bore 572 and being linearly flanked by two outer bearing spindles 556, said spindles distributed along one side of said skate plate and each spindle receiving a rotating main bearing 62 retained to respective spindles by appropriate bearing retaining caps 564 and bolts 566, 568; preferably said skate plate has two spring-loaded rotating lateral bearing mounting post member assemblies 57 spaced between adjacent spindles and each post member assembly having two replaceable bearing wiper pads 82 respectively attached to two opposite post member arced surfaces facing each adjacent rotating main bearing to contact and to wipe the outer surface of the bearing as it rotates; preferably, a pair of coaxial generally vertical axis lateral bearings 76 are rotatably and eccentrically and laterally adjustably mounted to each post member in coaxial cam hub mounting bores by appropriate cam hub retainers 78 and hub position fixing bolts 80; said lateral bearings each rotate in a respective plane that is perpendicular to the pivot plane of the skate plate and the rotation planes of the rotating main bearings 62.

Referring to FIGS. 25 to 30, a sixth embodiment pivotable bearing skate 650 comprises a generally planar and intermedially (intermediately) pivotable skate plate 652 having a central bearing spindle 653 having a preferably coaxial pivot bore 654 sized to pivotally receive and retain a stub axle 642 having a coaxial retainer bolt bore 644 and being linearly flanked by two outer bearing spindles 656, said spindles distributed along one side of said skate plate and each spindle receiving a rotating main bearing 62 retained to respective spindles by appropriate bearing retaining caps 664, 667 and bolts 666, 668; preferably said skate plate has two double-arc-shaped divider walls 670 depending outward from and across a portion of said skate plate surface and spaced between adjacent spindles, and each divider wall having two replaceable bearing wiper pads 82 respectively attached to two preferably arc-shaped divider wall surfaces facing a portion of the outer circumference surface of each adjacent rotating main bearing to contact and to wipe the outer circumference surface of said rotating main bearing as it rotates; preferably, a pair of coaxial generally vertical axis lateral bearings 76 are rotatably and eccentrically and laterally adjustably mounted to each divider wall in cam hub mounting bores 672 by appropriate cam hub retainers 78 and hub position fixing bolts 80; said lateral bearings each rotate in a respective plane that is perpendicular to the pivot plane of the skate plate and the rotational planes of the rotating main bearings 62.

Figure 31:
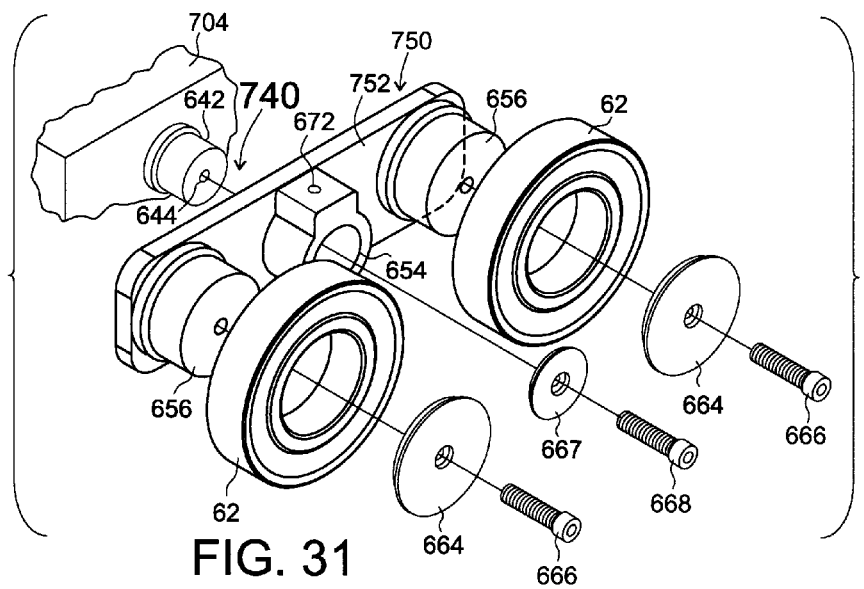
FIG. 31 is an exploded, perspective view of a seventh embodiment pivotable bearing skate 750 to be mounted on a partially shown anchor frame 704 of a partially shown cargo bed frame assembly 740.

Referring to FIG. 31, a seventh embodiment pivotable bearing skate 750 to be mounted on a stub axle 642 having a skate retainer bolt receiving bore 644 attached to an anchor frame 704 of a cargo frame assembly 740, said seventh embodiment pivotable bearing skate comprising a pivotable skate plate 752 having a generally central transverse pivot bore 654 located between a first rotating main bearing 62 at one end of said skate plate and a second rotating main bearing 62 at the other end (the upper contact points of the two rotating main bearings are tangent to the same line and the lower contact points of said main bearings are tangent to spaced parallel lines because the skate plate pivots to bring the two upper contact points or the two lower contact points into alignment against the upper inner load bearing surface of a bearing skate channel 18, 20 of the transfer frame or the lower inner load bearing surface of the respective bearing skate channel thereby accommodating the changing geometries between the bearings and the surfaces that the bearings impinge upon as the frames are pulled or pushed between an open position and a closed position).

Figure 32:
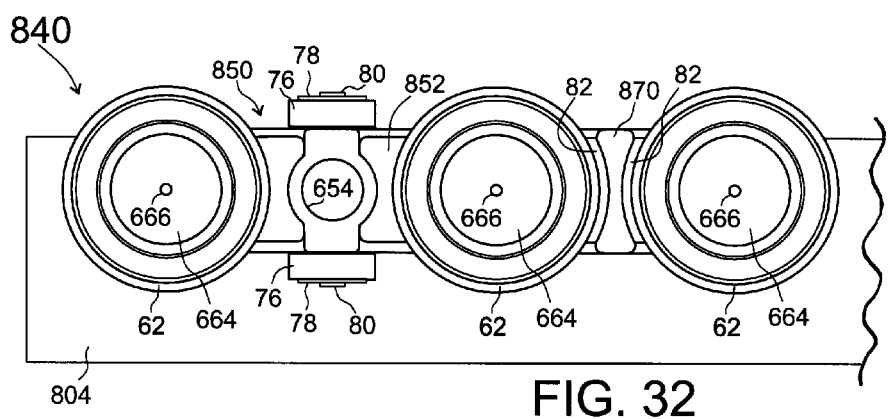
FIG. 32 is a partial front view of a portion of an anchor frame 804 cargo bed frame assembly 840 showing an eighth embodiment pivotable bearing skate 850.

Referring to FIG. 32, an eighth embodiment pivotable bearing skate 850 comprises a pivotable skate plate 852 having a generally central transverse pivot bore 654 located and spaced between three in-line same size rotating main bearings 62 with one said main bearing at one end of said skate plate and the other two said main bearings 62 at the other end with the upper contact points of said three main bearings tangent to a first common tangent line and the lower contact points of said bearings tangent to a second common tangent line because the skate plate pivots to bring the three upper contact points or the three lower contact points into alignment against the upper inner surface of a bearing channel of the transfer frame or the lower inner surface of the respective bearing channel thereby accommodating the changing geometries between the bearings and the surfaces that the bearings impinge upon as the frames are pulled or pushed between an open position and a closed position. Preferably, a double-arcshaped divider wall 870 depends outward from said skate plate surface and spaced between adjacent said rotating main bearings and said divider wall having two replaceable bearing wiper pads 82 respectively attached to two preferably arc-shaped divider wall surfaces facing a portion of the outer circumference surface of each adjacent rotating main bearing to contact and to wipe the outer circumference surface of said rotating main bearing as it rotates.

Preferably, suitable mechanical channel stops not shown in the figures are removably attached by bolts and nuts or other suitable fastening means at the ends of the bearing channels 18, 20 of the various embodiments of the pivotable bearing skate extendable cargo bed frame assemblies 140, 240, 340, 440, 540, 640, 740, or 840.

The various anchor frames, transfer frames, cargo frames, stub axles, stub axle sleeves, skate plates, hubs, and post members of the various pivotable bearing skate extendable cargo bed frame assemblies 140, 240, 340, 440, 540, 640, 740, or 840 disclosed in the specification preferably can be fabricated from suitable aluminum alloy or steel alloy stock or from other suitable materials using well known machine shop techniques including conventional welding techniques The bolts of the pivotable bearing skates 50, 250, 350, 450, 550, 650, 750, or 850 are preferably grade 8 bolts or other suitable grade bolts.

The rotating main bearings incorporated into the pivotable bearing skates 50, 250, 350, 450, 550, 650, 750, or 850 can be selected from the inventories of a plentiful list of ball bearing and roller bearing suppliers that may be conveniently found on the world wide web. Preferably, the rotating main bearings 62 are single race ball bearings but double race ball bearings or other suitable bearings could be used. Preferably, the smaller radius rotating main bearings 262, 362 are single race roller bearings, but other suitable bearings could be used.

The preceding description and exposition of a preferred embodiment of the invention is presented for purposes of illustration and enabling disclosure. It is neither intended to be exhaustive nor to limit the invention to the precise form disclosed. Modifications or variations in the invention in light of the above teachings that are obvious to one of ordinary skill in the art are considered within the scope of the invention as determined by the appended claims when interpreted to the breath to which they are fairly, legitimately and equitably entitled.

We claim:

1. An extendable cargo bed frame assembly [140] for a motor vehicle comprising
    an anchor frame [104] attached to a floor of the cargo area of said motor vehicle;
    and said anchor frame having a pair of coaxial end anchor frame stub axles [42] attached transversely at the end extending outwardly from said motor vehicle of said anchor frame to extend outwardly from one another and selectively spaced parallel from
    a pair of coaxial intermediate anchor frame stub axles [44] attached to selected intermediate portions of said anchor frame to extend outwardly from one another, and having a pair of anchor frame end pivotable bearing skates each having a plurality of rotating main bearings and having a pair of anchor frame intermediate pivotable bearing skates each having a plurality of rotating main bearings, each said skate pivotally mounted respectively to one of said anchor frame stub axles; and
    an intermediate transfer frame [12] having two spaced and parallel transfer frame slide rails [14] held in parallel spaced relationship to each other, each of said slide rails having an inner anchor frame pivotable bearing skate channel [18] for operatively receiving said plurality of rotating main bearings of each of said anchor frame pivotable bearing skates and having at the ends of each of said anchor frame pivotable bearing skate channel, means for stopping the travel of said rotating main bearings of said anchor frame pivotable bearing skates, and
    each of said slide rails further having, on the opposite side from said anchor frame pivotable bearing skate channel, an outer cargo frame pivotable bearing skate channel [20] for operatively receiving said plurality of rotating main bearings of each of said cargo frame pivotable bearing skates, and having at the ends of each of said cargo frame pivotable bearing skate channels, means for stopping the travel of said rotating main bearings of said cargo frame pivotable bearing skates; and each pivotable bearing skate channel sized to rotatably and operatively receive a plurality of rotating main bearings and with one said pivotable bearing skate channel on each side of said slide rail; and
    a cargo frame [122] having two spaced and parallel cargo frame side rails [24] held in parallel spaced relationship to each other; and a pair of coaxial end cargo frame stub axles [46] attached transversely at the end extending inwardly to said motor vehicle of said cargo frame to extend inwardly towards one another and selectively spaced parallel from
    a pair of coaxial intermediate cargo frame stub axles [48] attached to selected intermediate portions of said cargo frame to extend towards one another, and having a pair of cargo frame end pivotable bearing skates each having a plurality of rotating main bearings and having a pair of cargo frame intermediate pivotable bearing skates each having a plurality of rotating main bearings, each said skate pivotally mounted respectively to one of said cargo frame stub axles.

2. An extendable cargo bed frame assembly in accordance with claim 1 wherein each said pivotable bearing skate comprising:
    a generally planar and rectangular pivotable skate plate [52] having
    a generally central transverse pivot bore [54] sized to pivotally receive one of said stub axles and
    said skate plate having two transverse bearing hub mounting bores [55] bracketing and preferably equidistant from said pivot bore,
    two spaced bearing hub mounting bolts [58], each said mounting bolt respectively inserted through and in one of said hub mounting bores, through and in
    one of two bearing hubs [60], through and in
    one of said rotating main bearings [62], and reversibly attached to
    one of two bearing retainer caps [64], said main bearings rotatably secured and having a generally common rotational plane parallel to the pivotal plane of said pivot bore.

3. An extendable cargo bed frame assembly in accordance with claim 2 wherein said skate plate further having
    four transverse spring and post member mounting bores [56] bracketing and preferably equidistant from said pivot bore and between said pivot bore and said hub mounting bores; further said skate plate having
    two post member assemblies [57], each said post member assembly respectively attached by
    two coil spring retention bolts [74], each said spring retention bolt inserted through and slidably retained in one of two said post member mounting bores closer to one of said hub mounting bores, coaxially through one of two coil compression springs [72], coaxially through
one of two partial depth bores [71] of said post member assembly and reversibly retained in
one of two coil spring retention bores [73] of said assembly;
each said post member assembly comprising a
lateral bearing post member [70] defined as having two opposite ends, two opposite concave and arc-shaped longitudinal sides, and two opposite spaced and parallel generally planar longitudinal sides; said post member having
two spaced and parallel said partial depth bores [71] and each said depth bore perpendicular to one of said planar longitudinal sides, said partial depth bores spaced to cooperatively and coaxially align with
two of said spring and post member retention bolt receiving bores [56] and each said depth bore sized to receive and hold
one of two said coil compression springs [72] that extends outwards beyond the outer surface of said post member; said post member having
one of two coaxial smaller diameter said coil spring retention bolt bores [73] at the bottom of each said partial depth bore, each said retention bolt bore sized to receive and retain one of said coil spring retention bolts [74] coaxially inserted through and slidably retained in said spring and post member retention bolt receiving bores, through said compression springs, through said partial depth bores, and reversibly retained in said coil spring retention bores; said post member having in each said post member opposite end,
one of two coaxial hub position fixing bolt bores [75];
two coaxial rotating lateral bearings [76] rotatably mounted respectively on
two cam bearing hubs [78] and fixed in a selected lateral position respectively by
two hub position fixing bolts [80] attached in said position fixing bolt bores.

* * * * *